United States Patent
McGrew et al.

(10) Patent No.: US 12,348,386 B2
(45) Date of Patent: *Jul. 1, 2025

(54) AUTOMATICALLY DETECTING AUTHORIZED REMOTE ADMINISTRATION SESSIONS IN A NETWORK MONITORING SYSTEM

(71) Applicant: Cisco Technology, Inc., San Jose, CA (US)

(72) Inventors: David McGrew, Poolesville, MD (US); Martin Rehak, Prague (CZ); Blake Harrell Anderson, Chapel Hill, NC (US); Sunil Amin, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/583,370

(22) Filed: Feb. 21, 2024

(65) Prior Publication Data
US 2024/0195705 A1 Jun. 13, 2024

Related U.S. Application Data

(63) Continuation of application No. 18/125,955, filed on Mar. 24, 2023, now Pat. No. 11,936,533, which is a
(Continued)

(51) Int. Cl.
*H04L 41/28* (2022.01)
*G06F 21/55* (2013.01)
(Continued)

(52) U.S. Cl.
CPC .............. *H04L 41/28* (2013.01); *G06F 21/55* (2013.01); *H04L 63/14* (2013.01);
(Continued)

(58) Field of Classification Search
CPC ................. H04L 63/1425; H04L 41/16; H04L 63/1416; H04L 63/1441; H04L 63/1458;
(Continued)

(56) References Cited

U.S. PATENT DOCUMENTS 7,802,109 B2 * 9/2010 Gouguenheim ...... H04L 9/0877
713/193
7,895,326 B2 * 2/2011 Jerrim ................. H04L 63/1416
709/224
(Continued)

OTHER PUBLICATIONS

International Search Report and Written Opinion for International Application No. PCT/US2018/064448, mailed Mar. 13, 2019, 10 Pages.

*Primary Examiner* — Sharif E Ullah
(74) *Attorney, Agent, or Firm* — BEHMKE INNOVATION GROUP LLC; James M. Behmke

(57) ABSTRACT

In one embodiment, a service receives administration traffic data in a network associated with a remote administration session in which a control device remotely administers a client device. The service analyzes the administration traffic data to determine whether any portion of the administration traffic data is resulting from an administration session involving a trusted administrator. The service flags a first portion of the administration traffic data as authorized when the first portion of the administration traffic data is determined to result from an administration session involving a trusted administrator, and a second portion of the administration traffic data is non-flagged. The service assesses the second portion of the administration traffic data using a machine learning-based traffic classifier to determine whether the second portion of the administration traffic data is malicious.

20 Claims, 8 Drawing Sheets

Related U.S. Application Data continuation of application No. 17/376,924, filed on Jul. 15, 2021, now Pat. No. 11,632,309, which is a continuation of application No. 15/848,101, filed on Dec. 20, 2017, now Pat. No. 11,075,820.

(51) Int. Cl.
  *H04L 9/40* (2022.01)
  *H04W 12/12* (2021.01)
  *H04L 67/143* (2022.01)

(52) U.S. Cl.
  CPC ...... *H04L 63/1425* (2013.01); *H04L 63/1441* (2013.01); *H04W 12/12* (2013.01); *H04L 63/20* (2013.01); *H04L 67/143* (2013.01)

(58) Field of Classification Search
  CPC ............ H04L 63/1408; H04L 43/08; H04L 63/145; H04L 63/20; H04L 43/062; H04L 43/16; H04L 41/28; G06F 21/552; G06F 21/554; G06F 21/566; G06F 9/45558; G06F 2009/45595; G06F 2009/45591; G06F 16/24578; G06F 16/285; G06F 21/55; H04W 84/18; H04W 24/02; H04W 24/08; H04W 12/12; H04W 12/128; H04W 72/08; H04W 12/122; H04W 24/04; H04W 4/70; H04W 84/12; H04W 12/06; H04W 12/065; H04W 4/24; H04W 12/08; H04W 12/125; H04W 12/126
  USPC ......... 726/22, 2, 21, 36; 713/150, 163, 181; 380/255, 264, 276
  See application file for complete search history.

(56) References Cited

U.S. PATENT DOCUMENTS

| | | | |
|---|---|---|---|
| 7,971,237 B2* | 6/2011 | Caslin | G06F 21/55 379/114.14 |
| 8,468,351 B2* | 6/2013 | Boesgaard Sorensen | G06F 21/554 713/168 |
| 8,549,645 B2* | 10/2013 | Tang | H04L 63/1458 726/22 |
| 8,621,615 B2* | 12/2013 | Zhao | H04L 63/1425 370/252 |
| 8,719,912 B2* | 5/2014 | Frey | H04L 9/3213 713/157 |
| 9,135,417 B2* | 9/2015 | Wang | H04L 9/0866 |
| 9,215,065 B2* | 12/2015 | Xiques | H04L 65/762 |
| 9,591,006 B2* | 3/2017 | Siva Kumar | H04L 63/10 |
| 9,641,544 B1* | 5/2017 | Treat | H04L 43/04 |
| 9,690,915 B2* | 6/2017 | Turgeman | G06F 21/552 |
| 9,736,251 B1* | 8/2017 | Samant | H04L 63/1425 |
| 9,838,409 B2* | 12/2017 | Flacher | H04L 63/1425 |
| 10,097,413 B2* | 10/2018 | Zhou | H04L 41/0816 |
| 10,162,943 B2* | 12/2018 | Park | H04L 63/08 |
| 10,257,214 B2* | 4/2019 | McGrew | H04L 43/026 |
| 10,356,106 B2* | 7/2019 | Engel | H04L 63/1408 |
| 2005/0132204 A1* | 6/2005 | Gouguenheim | G06F 21/10 713/193 |
| 2009/0328177 A1* | 12/2009 | Frey | H04L 9/3213 726/9 |
| 2010/0017615 A1* | 1/2010 | Boesgaard Sorensen | G06F 21/606 713/176 |
| 2013/0104230 A1* | 4/2013 | Tang | G06F 21/552 726/23 |
| 2013/0219178 A1* | 8/2013 | Xiques | H04L 65/70 713/168 |
| 2013/0318358 A1* | 11/2013 | Wang | H04L 9/0866 713/182 |
| 2016/0088000 A1* | 3/2016 | Siva Kumar | H04L 63/1416 726/23 |
| 2016/0234167 A1* | 8/2016 | Engel | H04L 63/1408 |
| 2016/0285685 A1* | 9/2016 | Zhou | H04L 41/0816 |
| 2017/0104773 A1* | 4/2017 | Flacher | H04L 63/1458 |
| 2017/0316185 A1* | 11/2017 | Park | G06F 21/105 |
| 2017/0374090 A1* | 12/2017 | McGrew | H04L 41/16 |

* cited by examiner

AUTOMATICALLY DETECTING AUTHORIZED REMOTE ADMINISTRATION SESSIONS IN A NETWORK MONITORING SYSTEM

RELATED APPLICATION

This application is a continuation of U.S. patent application Ser. No. 18/125,955, filed on Mar. 24, 2023, U.S. patent application Ser. No. 17/376,924, filed on Jul. 15, 2021 and U.S. patent application Ser. No. 15/848,101, filed on Dec. 20, 2017, all entitled AUTOMATICALLY DETECTING AUTHORIZED REMOTE ADMINISTRATION SESSIONS IN A NETWORK MONITORING SYSTEM, by David McGrew, et al., the entire contents of which are incorporated by reference herein.

TECHNICAL FIELD

The present disclosure relates generally to computer networks, and, more particularly, to automatically detecting authorized remote administration sessions in a network monitoring system.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic.

Beyond the various types of legitimate application traffic in a network, some network traffic may also be malicious. For example, some traffic may seek to overwhelm a service by sending a large number of requests to the service. Such attacks are also sometimes known as denial of service (DOS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected client devices.

In the case of malware that receives control commands from a remote source, the control traffic associated with the infected client is often made to look very similar to administrator traffic that may be sent by an Information Technology (IT) department or other legitimate source. For example, control commands can be sent to a client device that has been infected with a Remote Access Trojan (RAT) using Secure Shell (SSH) traffic, making the malicious SSH traffic appear very similar to that of legitimate administrator traffic, from a behavioral standpoint.

BRIEF DESCRIPTION OF THE DRA WINGS

The embodiments herein may be better understood by referring to the following description in conjunction with the accompanying drawings in which like reference numerals indicate identically or functionally similar elements, of which:

DESCRIPTION OF EXAMPLE EMBODIMENTS

Overview

Figure 1A:
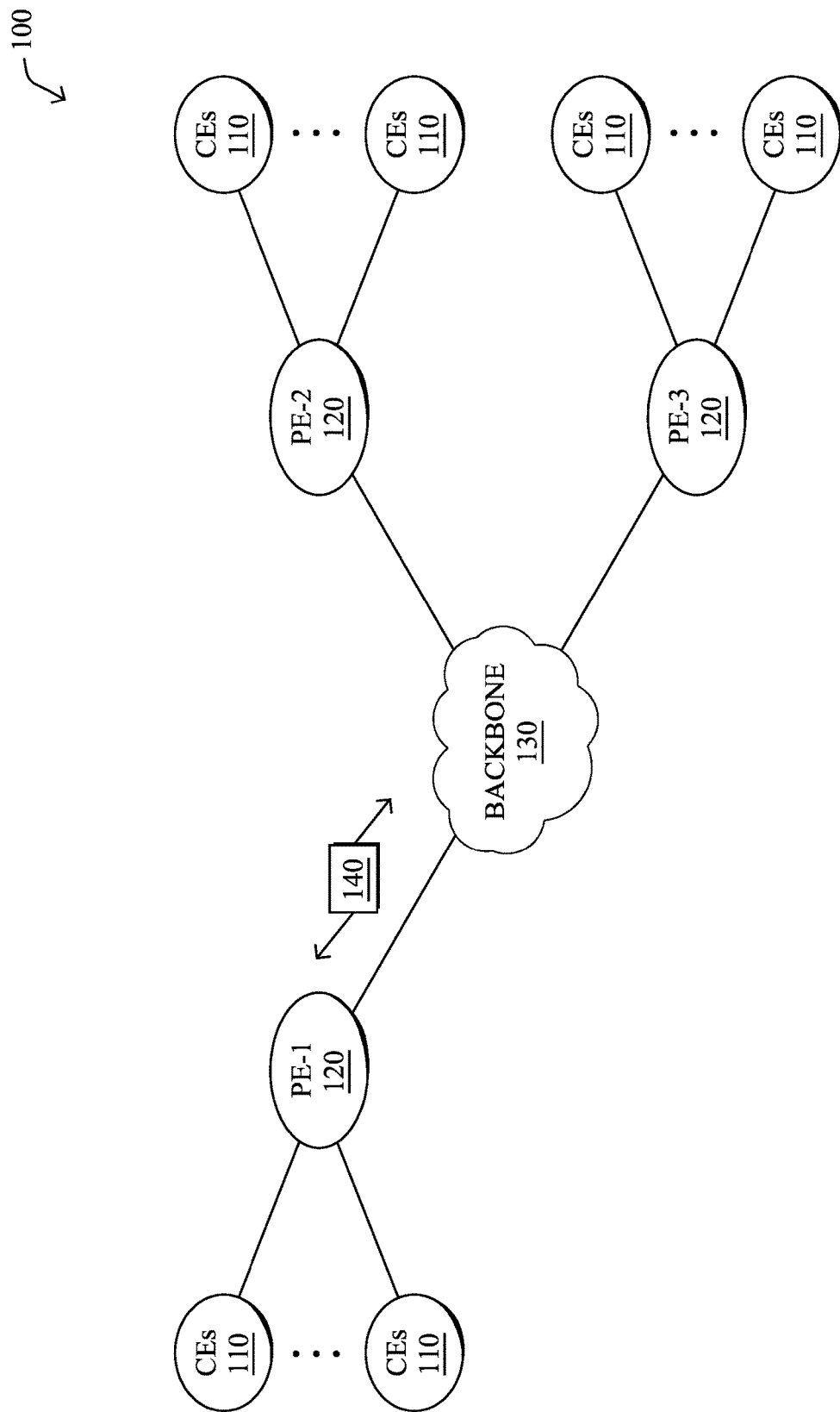
FIGS. 1A-1B illustrate an example communication network.

According to one or more embodiments of the disclosure, a service receives data regarding administration traffic in a network associated with a remote administration session in which a control device remotely administers a client device. The service analyzes the received data to determine whether the administration traffic is authorized. The service flags the received data as authorized, based on the analysis of the received data. The service uses the data flagged as authorized to distinguish between benign traffic and malicious traffic in the network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection). Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
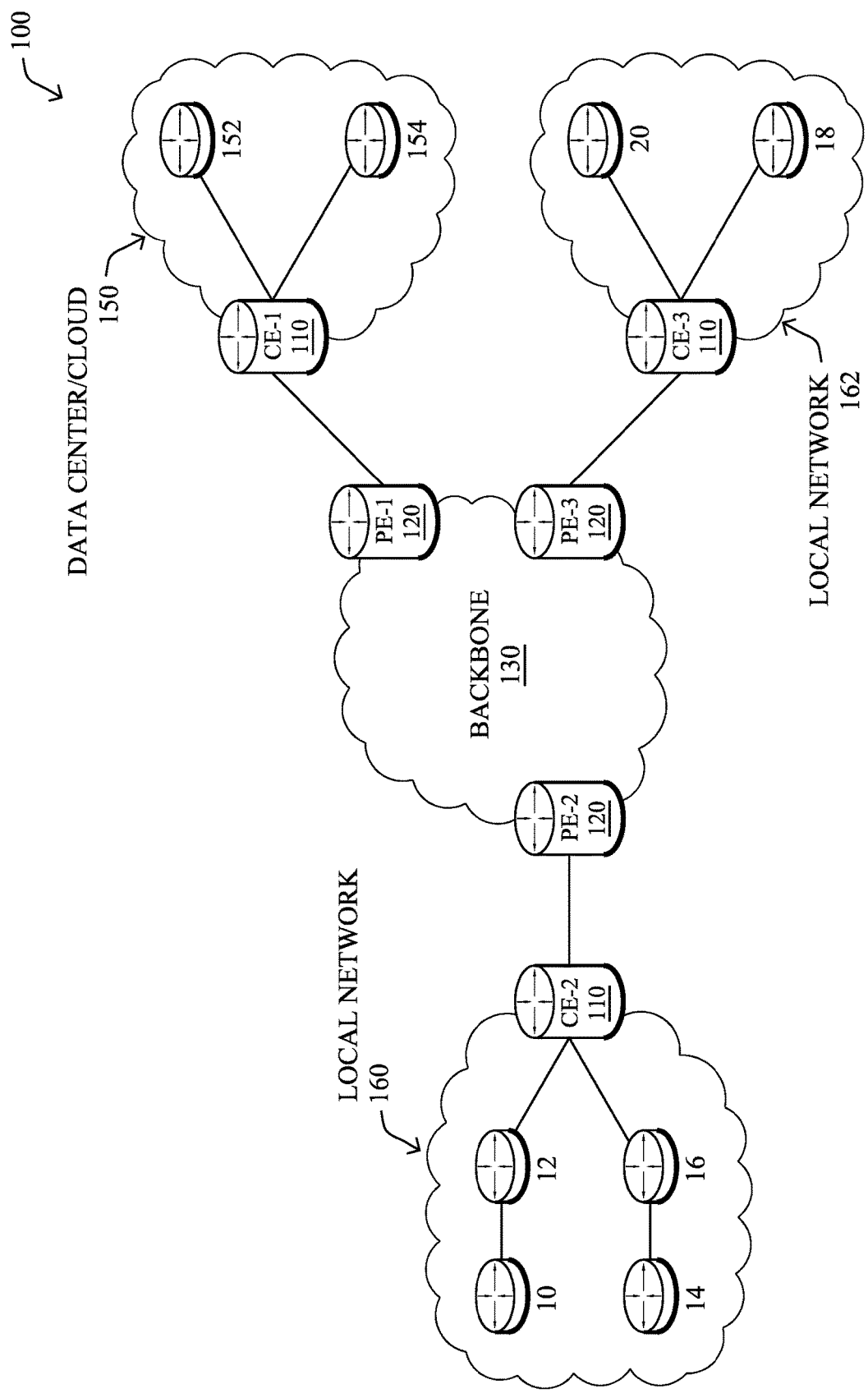

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
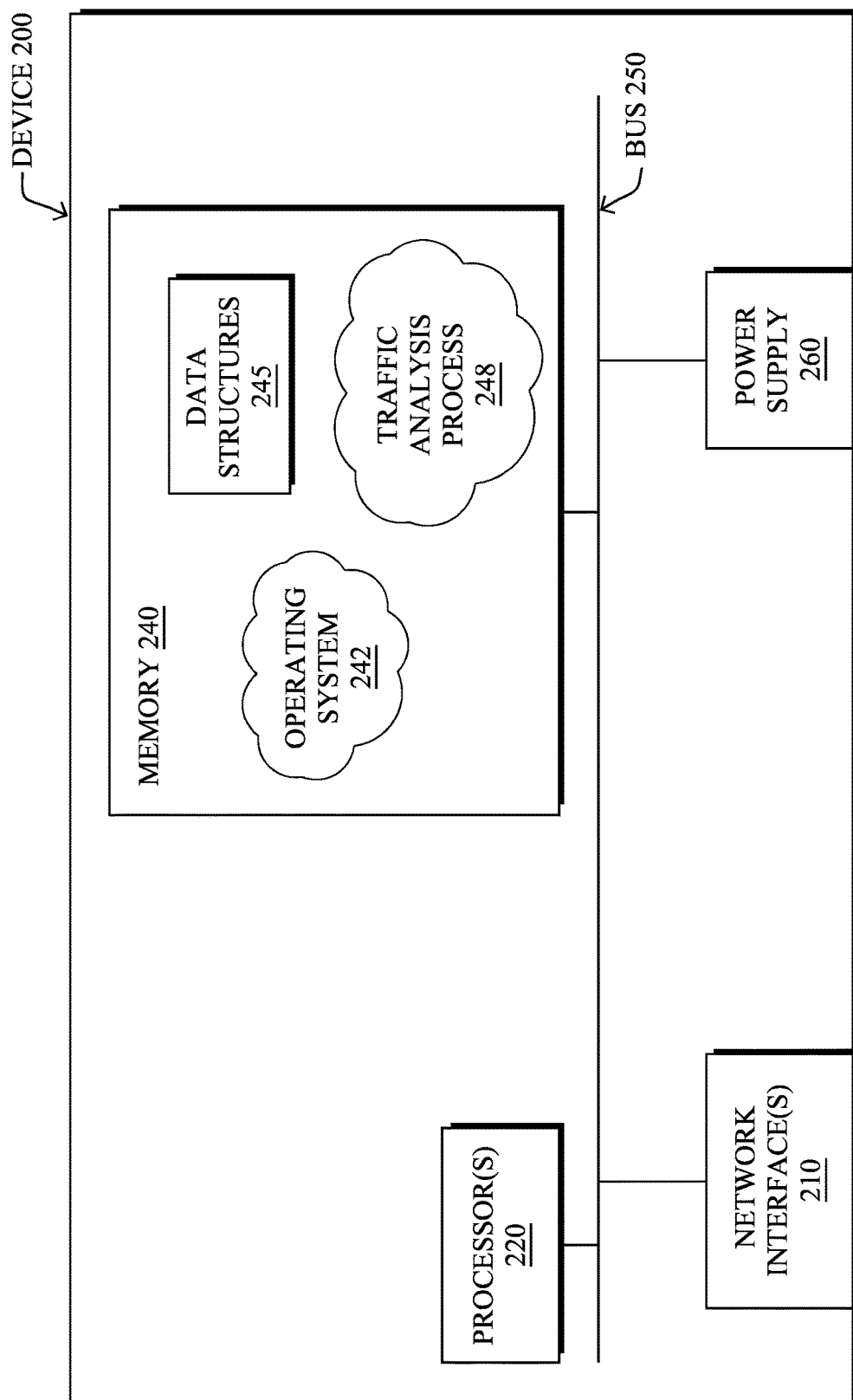
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify encrypted traffic in the network (and its originating application) for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DOS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
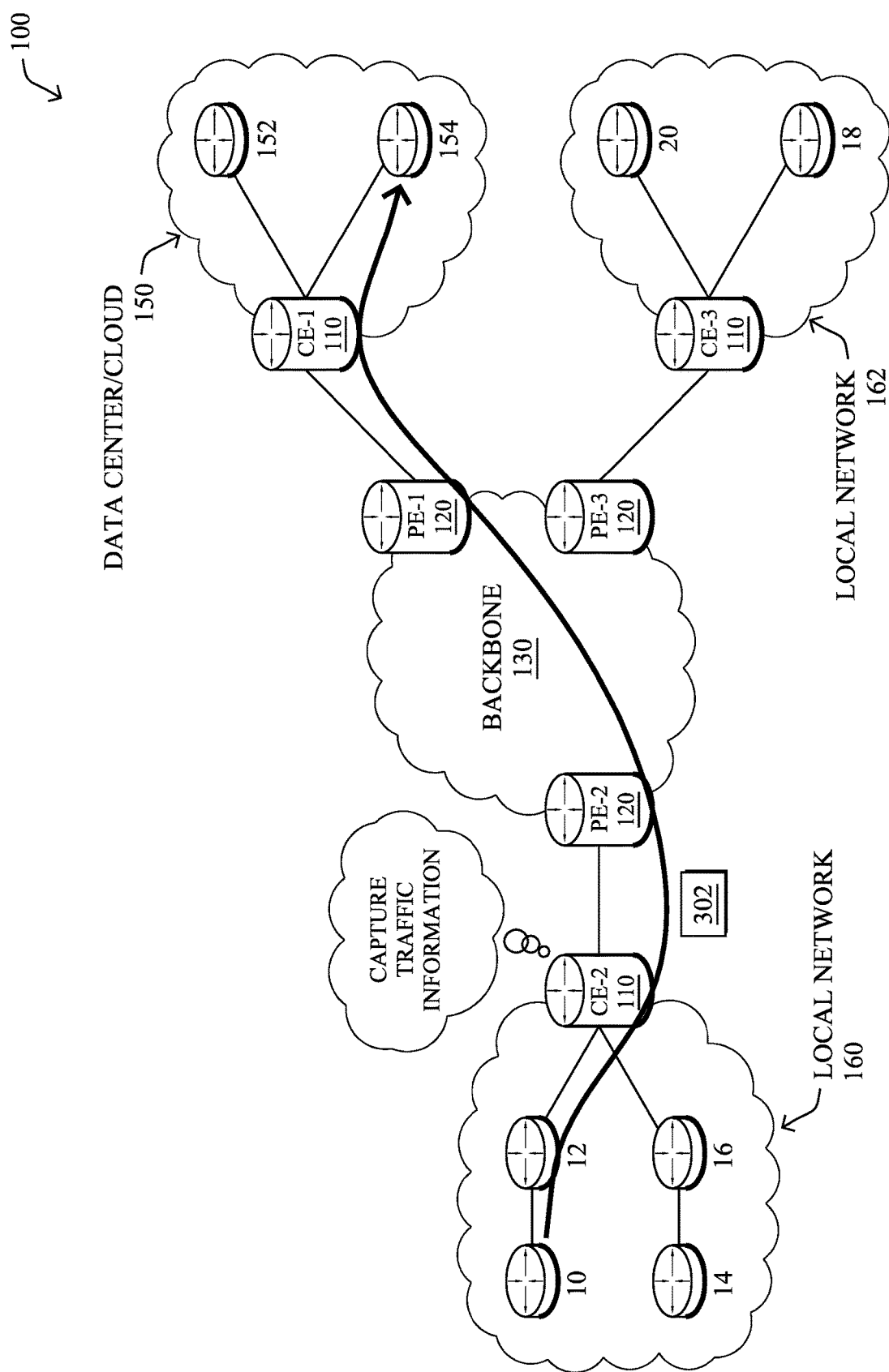
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions, etc., HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, a traffic analysis process can be configured using the techniques herein to analyze network traffic telemetry and assess whether a traffic flow is benign or malicious. This is true, even in the case of encrypted flows, such as HTTPS traffic. Notably, a machine learning-based model can be trained using examples of benign and malicious traffic to distinguish between these two categories. In turn, the traffic analysis process can cause any number of mitigation actions to be performed, when it detects a malicious flow. For example, the process can cause the flow to be blocked, an alert to be sent (e.g., to an administrator or user), or the like.

While the above techniques are quite effective at identifying malicious network traffic, there are also certain types of benign and malicious traffic that appear very similar to one another, making the detection of the malicious traffic much more challenging. One example of this is the case of administration traffic that can be either benign or malicious, depending on the circumstances.

Figure 4:
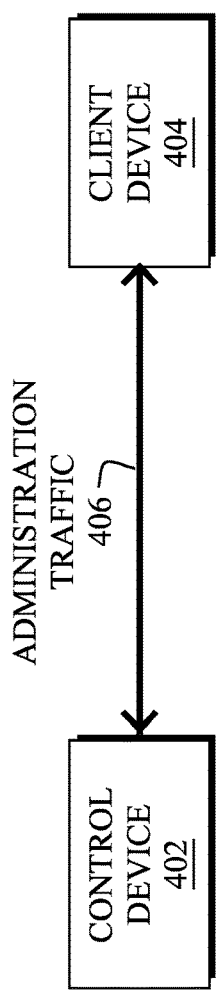
FIG. 4 illustrates an example administration session between devices.

FIG. 4 illustrates an example 400 of an administration session between devices, in some embodiments. As show, assume that a client device 404 is in communication with a control device 402, either via a local network or via an external network (e.g., the Internet, an MPLS network, etc.). In many cases, client device 404 is a user device, such as a desktop computer, laptop computer, tablet device, phone, other mobile device, or the like. However, in further embodiments, client device 404 may be a server, networking device (e.g., a router, switch, a software defined networking device, etc.), or other device configured for remote administration.

Similarly, control device 402 may generally be any device configured to perform administrative control over client device 404. For example, control device 402 may be operated by an IT administrator to administratively control client device 404. Accordingly, during an administration session in which control device 402 provides control over client device 404, control device 402 and client device 404 may exchange administration traffic 406. Examples of administration traffic 406 may include, but are not limited to, secure shell (SSH) traffic, secure copy (SCP) traffic, secure file transfer protocol (SFTP) traffic, remote desktop traffic, and the like.

From a traffic analysis standpoint, not all administration traffic 406 is authorized and benign. For example, assume that control device 402 is operated by a malicious entity and that client device 404 has been infected with malware that allows the malicious entity to remotely administer client device 404. In such a case, the exchanged administration traffic 406 may be very similar to, or even indistinguishable from, that of benign and authorized administration traffic in the network (e.g., as initiated by a trusted network administrator).

Automatically Detecting Authorized Remote Administration Settings in a Network Monitoring System The techniques herein automatically detect authorized remote administration sessions in a network monitoring and analysis system by using telemetry from administration servers, determining which network sessions are trusted, and marking those sessions as trusted. In some aspects, this mechanism can be used to prevent the telemetry data from being used as input to a traffic classifier, such as a Remote Access Trojan (RAT) detection system, that distinguishes between benign and malicious traffic. In another aspect, the flagged telemetry data may still be input to the traffic classifier, but any resulting mitigation actions may be prevented (e.g., blocking the traffic, etc.), if the traffic is authorized. In a further aspect, the data flagged as authorized can be used as part of a training dataset, to train a machine learning-based traffic classifier to distinguish between authorized and benign administration traffic and malicious administration traffic.

Specifically, according to one or more embodiments of the disclosure as described in detail below, a service receives data regarding administration traffic in a network associated with a remote administration session in which a control device remotely administers a client device. The service analyzes the received data to determine whether the administration traffic is authorized. The service flags the received data as authorized, based on the analysis of the received data. The service uses the data flagged as authorized to distinguish between benign traffic and malicious traffic in the network.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Figure 5:
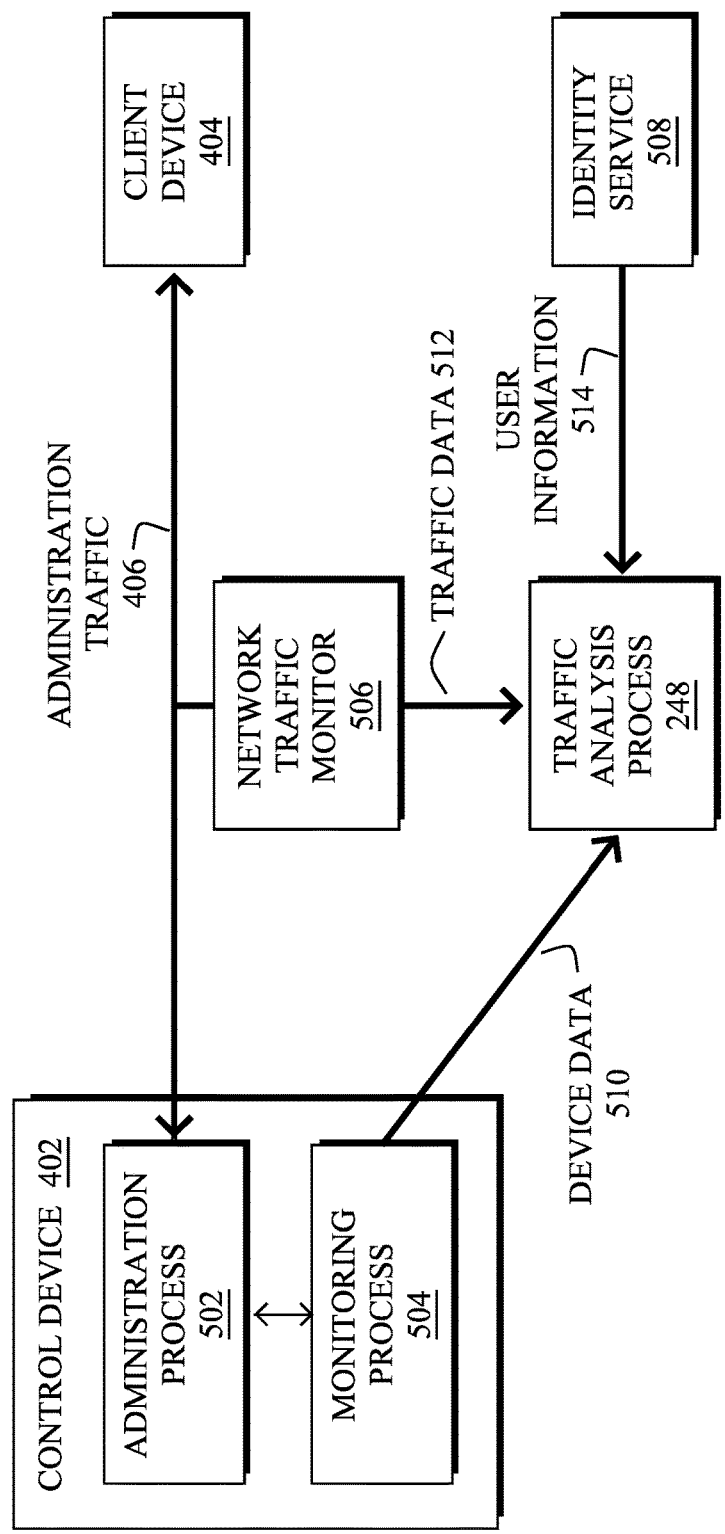
FIG. 5 illustrates an example system for capturing data regarding administration traffic.

Operationally, FIG. 5 illustrates an example system 500 for capturing data regarding administration traffic, according to various embodiments. From a high level, certain aspects of the techniques herein may leverage traffic analysis of (un)encrypted network traffic, to compare how administrators and non-administrators are acting in the network. Continuing the example of FIG. 4, assume that control device 402 communicates administration traffic 406 with client device 404. In such a case, control device 402 may execute an administration process 502 that initiates an administration session with client device 404 and handles the corresponding administration traffic 406.

In general, administration process 502 may be any executable process that allows control device 402 to administratively control client device 404 via the network. For example, administration process 502 may be Enterprise Desktop Management (EDM) software that can push or pull files to/from the desktop of client device 404, return other sorts of data to an EDM server, and/or provide an authorized IT administrator control over client device 404. In further cases, administration process 502 may leverage SSH or SCP to the same end.

In various embodiments, a network traffic monitor 506 may monitor administration traffic 406 between control device 402 and client device 404, to collect telemetry data about traffic 406. In turn, network traffic monitor 506 may report the captured telemetry data to traffic analysis process 248 as traffic data 512. Traffic data 512 may include any or all of the traffic features described previously, such as addresses, ports, packet information, timing information, or the like. As would be appreciated, network traffic monitor 506 may be an intermediary device that directly communicates administration traffic 406 (e.g., a router, switch, etc.) or may be a device that simply observes and reports on traffic 406. Examples of traffic data 512 may include NetFlow log information, IPFIX information, or any other form of traffic data that can be captured and exported to traffic analysis process 248. Depending on the implementation, traffic analysis process 248 may be implemented on the same device as that of network traffic monitor 506 (e.g., as a local service) or on a remote device in communication with network traffic monitor 506 (e.g., as a remote service).

One key aspect of the techniques herein is the identification of network traffic that results from an administration session involving a trusted administrator. To that end, data can also be gathered in system 500, to allow traffic analysis process 248 to determine whether traffic data 512 is associated with a trusted administrator. In some embodiments, as shown, a monitoring process 504 can be installed onto any control device that is executed by a trusted administrator. For example, if control device 402 is known to be operated by a trusted administrator, monitoring process 504 can be deployed to control device 402, to monitor the local device 402. Examples of monitoring process 504 may include, but are not limited to, any or all of the following: the Network Visibility Module (NVM) from Cisco Systems, Inc., custom monitoring processes specifically tailored to monitor a given administration process 502, other available system monitoring processes, and the like.

During operation, monitoring process 504 may observe and record information about the state and actions of control device 402 such as user information, network traffic information (e.g., addresses, ports, DNS names, etc. of traffic sent by or to control device 402), process information (e.g., information about the running processes/applications on control device 402), or any other information about the local state of control device 402. For example, in the case in which control device sends or receives administration traffic 406, monitoring process 504 may determine that this traffic is associated with administration process 502. In turn, monitoring process 504 may report any of the observed information to traffic analysis process 248 as device data 510.

In some embodiments, system 500 may also include an identity service 508 that maintains a record of network user accounts and their associated privileges. Such a service may provide user information 514 to traffic analysis process 248. For example, in some cases, user information 514 may indicate to traffic analysis process 248 that control device 402 is being operated by an authorized administrator, as well as their level of security privileges.

By capturing and reporting device data 510 and/or user information 514 to traffic analysis process 248, traffic analysis process 248 may use this information to determine whether administration traffic 406 is authorized. For example, as detailed below, traffic analysis process 248 may correlate traffic data 512 regarding administration traffic 406 with device data 510 and/or user information 514, to determine that traffic 406 is for an authorized administration session between control device 402 and client device 404. In turn, traffic analysis process 248 may use this information to avoid generating alarms or initiating other mitigation actions with respect to traffic 406, which may otherwise appear as malicious traffic, such as traffic associated with a RAT.

Figure 6:
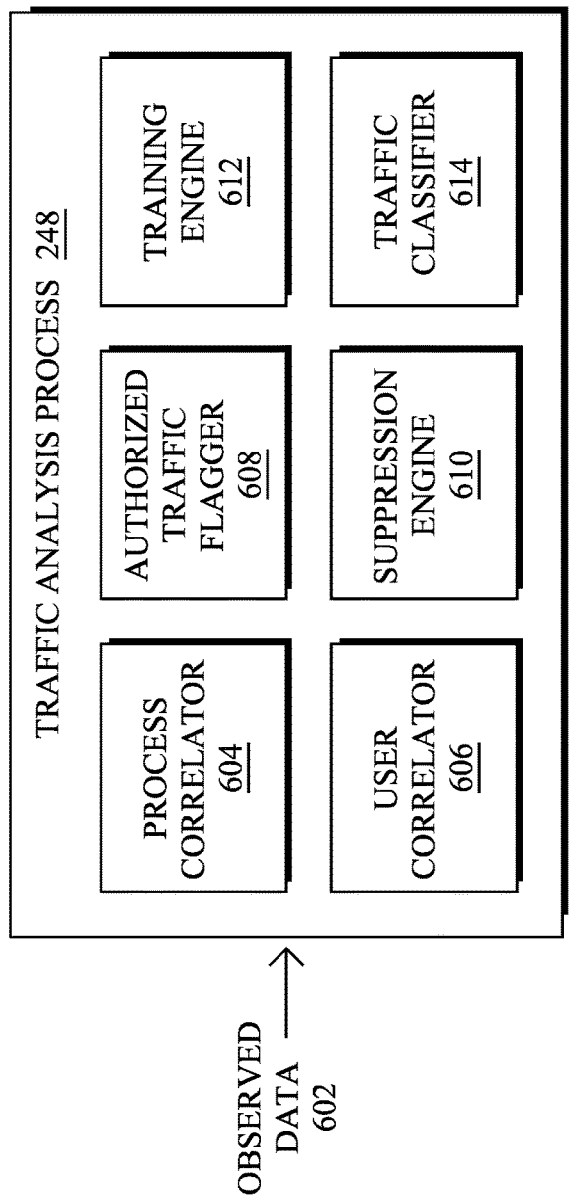
FIG. 6 illustrates an example architecture for analyzing network traffic.

FIG. 6 illustrates an example architecture 600 for analyzing network traffic, according to various embodiments. As shown, traffic analysis process 248 may include any number of sub-processes and/or memory locations, such as components 604-614. Further, the components of architecture 600 may be implemented in a distributed manner or implemented as its own stand-alone service, either as part of the local network under observation or as a remote service. In addition, the functionalities of the components 604-614 of architecture 600 may be combined, omitted, or implemented as part of other processes, as desired.

During execution, traffic analysis process may receive observed data 602 regarding administration traffic observed in the network. For example observed data 602 may comprise traffic data collected by one or more network traffic monitors (e.g., traffic data 512). In addition, observed data 602 may comprise data collected from the control device and/or about the user associated with the control device (e.g., device data 510 and/or user information 514).

In various embodiments, traffic analysis process 248 may include an authorized traffic flagger 608 configured to analyze observed data 602, to determine whether an observed traffic flow in the network is associated with an authorized administration session. If so, authorized traffic flagger 608 may flag the recorded traffic data as being authorized, accordingly. In a simple implementation, authorized traffic flagger 608 may assess the address(es) associated with the observed traffic (e.g., IP addresses, link layer addresses, etc.), to determine whether the traffic was sent to, or sent by, an authorized control device. Thus, if an administrator is using a known administration station to perform remote administration of a client in the network, authorized traffic flagger 608 may presume that this traffic is authorized and flag it as such. However, this approach would also lead to the potential of ignoring malicious traffic from the control device.

In further embodiments, authorized traffic flagger 608 may operate in conjunction with process correlator 604. If observed data 602 include data captured by a monitoring process installed on the control device, process correlator 604 may correlate the captured device data with that of the observed traffic data, to further identify the administration process involved in the administration session. In addition, data about the source and destination ports are available, then individual sessions can be identified. This allows authorized traffic flagger 608 to assess the individual traffic flows associated with a control device, to determine whether that flow is part of an authorized administration session. For example, assume that a device that is typically operated by an authorized administrator begins sending administration traffic via an unknown process. In such a case, authorized traffic flagger 608 and process correlator 604 can determine that the observed traffic was not from an authorized process and flag the traffic data, accordingly.

In another embodiment, user correlator 606 may operate in conjunction with authorized traffic flagger 608, to determine whether administration traffic is authorized, based in part on the user account involved. For example, user correlator 606 may correlate user information in observed data 602 regarding a user account with the observed network traffic, to determine whether the traffic was sent by an authorized administrator. In turn, authorized traffic flagger 608 may flag the traffic data as part of an authorized administration session, if it was initiated by an authorized administrator in the network.

As detailed above, traffic analysis process 248 may also include a traffic classifier 614 configured to distinguish between benign and malicious traffic in the network. For example, in some cases, traffic classifier 614 may include a machine learning-based classifier that has been trained using training data that comprises labeled samples of malicious traffic and benign traffic. However, traffic classifier 614 may also be unable to accurately distinguish between benign and malicious administration traffic, in many cases, due to these types of traffic having very similar characteristics.

Various opportunities present themselves, when authorized traffic flagger 608 determines that administration traffic observed in the network is authorized. In some embodiments, traffic analysis process 248 may include a suppression engine 610 configured to ensure that mitigation actions are not taken with respect to authorized administration traffic. Notably, since traffic classifier 614 may not be able to fully distinguish between benign and malicious administration traffic observed in the network, suppression engine 610 may operate in conjunction with traffic classifier 614, to prevent alerts or other actions from taking place as a result of traffic classifier 614 incorrectly determining that authorized administration traffic is malicious.

In one embodiment, suppression engine 610 may prevent any administration traffic data that has been flagged by authorized traffic flagger 608 as authorized from being assessed by traffic classifier 614. In further embodiments, suppression engine 610 may still allow the flagged traffic data to be assessed by traffic classifier 614, but instead prevent the performance of any mitigation actions with respect to this traffic, based on authorized traffic flagger 608 flagging the traffic as authorized administration traffic.

In some embodiments, the flagging of authorized administration traffic by flagger 608 over time may result in the collection of a pool of data that can be used to train a traffic classifier 614 that is more specific to administration traffic. For example, training engine 612 may use the data flagged as authorized to train a model in traffic classifier 614 that is able to identify when an authorized user or control device is behaving unexpectedly. For example, by clustering the observed data regarding authorized administration traffic from any number of different users and/or devices, traffic classifier 614 can determine whether a particular administration traffic flow is considered to be an outlier.

Behavioral outliers among observed administration traffic may indicate the presence of 'insider threat' malfeasance or infection of the control device. For example, if administration traffic from an authorized user or device is very different from that of other authorized users or devices, this may indicate that the administrator is doing something that he or she should not be doing. Of course, administration traffic from an unauthorized device or user can similarly be deemed malicious and traffic analysis process 248 can initiate the appropriate mitigation actions.

Figure 7:
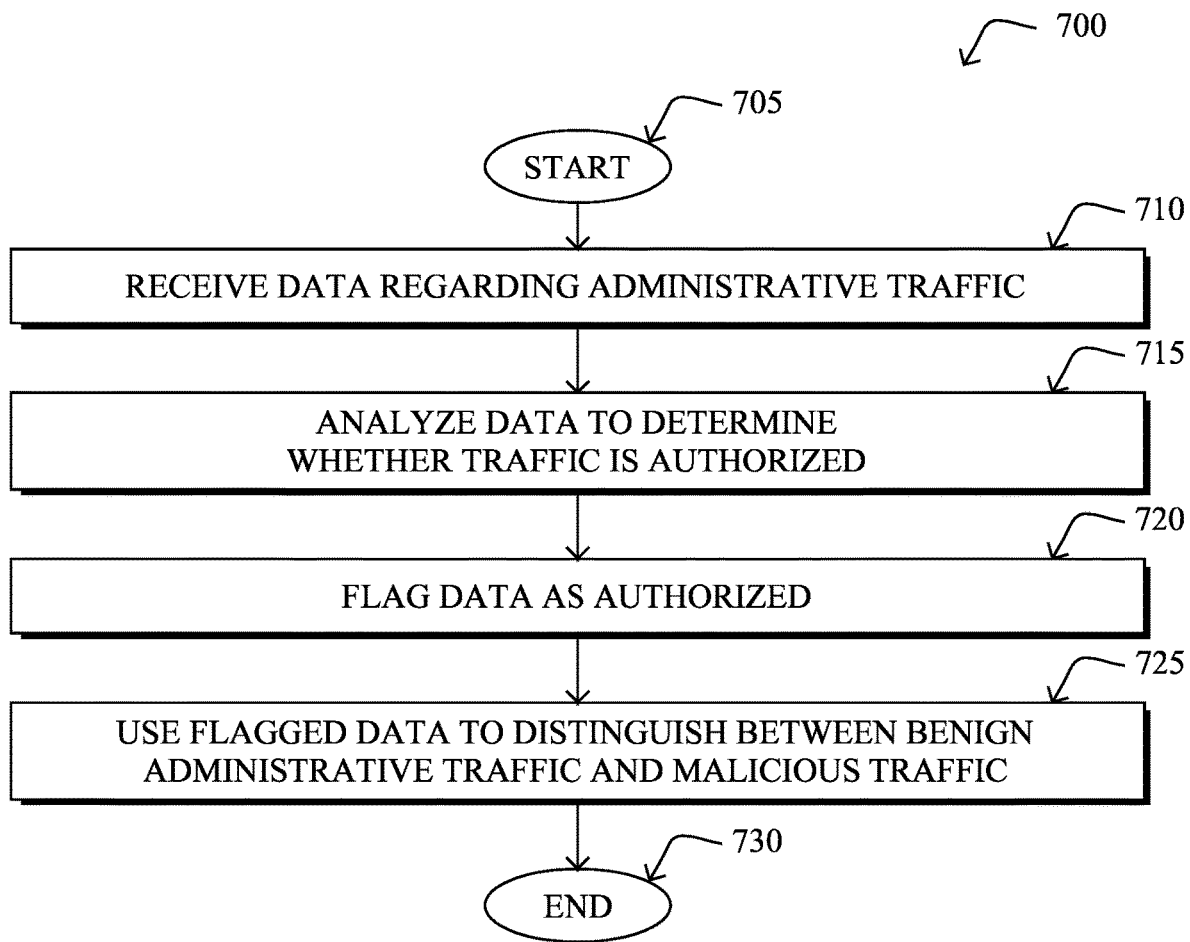
FIG. 7 illustrates an example simplified procedure for analyzing network traffic.

FIG. 7 illustrates an example simplified procedure for analyzing network traffic, in accordance with one or more embodiments described herein. For example, a non-generic, specifically configured device (e.g., device 200) may perform procedure 700 by executing stored instructions (e.g., process 248), to implement a service. The procedure 700 may start at step 705, and continues to step 710, where, as described in greater detail above, the service may receive data regarding administration traffic in a network associated with a remote administration session in which a control device remotely administers a client device.

In various embodiments, the received data may include any number of traffic characteristics that may be observed by the network. For example, the received data may include telemetry data indicative of addresses, ports, durations, packet information (e.g., sizes, etc.), TLS information, or any other information that can be captured about the traffic by one or more network traffic monitors (e.g., a NetFlow or IPFIX exporter, etc.). In further embodiments, the received data may also include information captured by a monitoring process executed by the control device, such as information about the user account operating the control device, the process/application associated with the administration traffic, or other such information. In yet another embodiment, the received data may also include user information about the administrator or other user operating the control device, such as the user permissions, etc.

At step 715, as detailed above, the service may analyze the received data to determine whether the administration traffic is authorized. In some cases, the service may correlate the traffic telemetry in the received data with any received process information, user information, and/or device information associated with the traffic. For example, if the administration traffic was generated by an authorized control device (e.g., by matching the traffic to a list of authorized hosts, etc.), by a device controlled by an authorized administrator, and/or was generated by an authorized process/application, the service may deem the administration traffic as authorized.

At step 720, the service may flag the received data as authorized, based on the analysis of the received data, as described in greater detail above. For example, the service may flag data regarding observed remote desktop administration traffic, SSH traffic, SCP traffic, as authorized, if that traffic was sent by an authorized device, user, and/or process.

At step 725, as detailed above, the service may use the data flagged as authorized to distinguish between benign traffic and malicious traffic in the network. In some embodiments, the service may exclude the flagged traffic data from analysis by a machine learning-based traffic analyzer configured to distinguish between administration traffic and malicious traffic. Notably, in many cases, the traffic characteristics of benign and malicious administration traffic may be similar enough that the analyzer is unable to reliably distinguish between the two. In another embodiment, the service may instead suppress the performance of a mitigation action by the traffic analyzer that was triggered by the traffic analyzer analyzing the flagged data. In further embodiments, the service may use the flagged data to train a machine learning-based traffic classifier to distinguish between benign traffic and malicious traffic. For example, a clustering approach may be taken to assess whether traffic associated with an otherwise authorized user, device, or process is behaving abnormally. If so, this may indicate malfeasance by the user or the presence of malware infection on the control device. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a network traffic monitoring system to identify authorized administration traffic among observed administration traffic in the network. This information can then be used to enhance the functioning of the system, such as by preventing the data regarding the authorized administration traffic from being analyzed by a traffic analyzer that detects malware (e.g., a RAT detector, etc.). As would be appreciated, such detectors may be unable to otherwise distinguish between malicious and benign administration traffic.

While there have been shown and described illustrative embodiments that provide for automatically detecting authorized remote administration sessions in a network monitoring system, it is to be understood that various other adaptations and modifications may be made within the spirit and scope of the embodiments herein. For example, while certain embodiments are described herein with respect to using certain models for purposes of malware or anomaly detection, the models are not limited as such and may be used for other functions, in other embodiments. In addition, while certain protocols are shown, such as HTTP and HTTPS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a service, administration traffic data in a network associated with a remote administration session in which a control device remotely administers a client device;
   analyzing, by the service, the administration traffic data to determine whether any portion of the administration traffic data results from an authorized application;
   flagging, by the service, a first portion of the administration traffic data as authorized when the first portion of the administration traffic data is determined to result from the administration session involving the authorized application, wherein a second portion of the administration traffic data is non-flagged;
   assessing, by the service, the administration traffic data to determine whether any portion of the administration traffic data is malicious; and
   performing, by the service and based on assessing the administration traffic data, a mitigation action in response to determining that a portion of the administration traffic data is malicious, wherein performance of the mitigation action is suppressed when the portion of the administration traffic data determined to be malicious is the first portion of the administration traffic data that is flagged as authorized.

2. The method as in claim 1, wherein analyzing the administration traffic data comprises:
   determining, by the service, that the control device was operated by a trusted administrator during the remote administration session.

3. The method as in claim 1, wherein at least a portion of the administration traffic data comprises data generated by a monitoring process executed by the control device.

4. The method as in claim 3, wherein at least a portion of the administration traffic data comprises data generated by a network traffic monitor between the control device and the client device in the network, and wherein analyzing the administration traffic data comprises:
   matching, by the service, a network address captured by the monitoring process executed by the control device to a network address captured by the network traffic monitor.

5. The method as in claim 3, wherein analyzing the administration traffic data comprises:
   identifying, by the service and from the data generated by the monitoring process executed by the control device, a particular process that was executed by the control device to initiate the remote administration session with the client device; and
   determining, by the service, whether the particular process is authorized.

6. The method as in claim 1, wherein determining that the portion of the administration traffic data is malicious is indicative of malfeasance by a trusted administrator in the network.

7. The method as in claim 1, wherein the remote administration session comprises at least one of: a remote desktop administration session, a Secure Shell (SSH) session, or Secure Copy (SCP) session.

8. An apparatus, comprising:
one or more network interfaces to communicate with a network;
a processor coupled to the one or more network interfaces and executing one or more operations; and
a memory storing a process that is executable by the processor, the process when executed causing the apparatus to:
receive administration traffic data in a network associated with a remote administration session in which a control device remotely administers a client device;
analyze the administration traffic data to determine whether any portion of the administration traffic data results from an authorized application;
flag a first portion of the administration traffic data as authorized when the first portion of the administration traffic data is determined to result from the administration session involving the authorized application, wherein a second portion of the administration traffic data is non-flagged;
assess the administration traffic data to determine whether any portion of the administration traffic data is malicious; and
perform, based on assessing the administration traffic data, a mitigation action in response to determining that a portion of the administration traffic data is malicious, wherein performance of the mitigation action is suppressed when the portion of the administration traffic data determined to be malicious is the first portion of the administration traffic data that is flagged as authorized.

9. The apparatus as in claim 8, wherein the apparatus analyzes the administration traffic data by:
determining that the control device was operated by a trusted administrator during the remote administration session.

10. The apparatus as in claim 8, wherein at least a portion of the administration traffic data comprises data generated by a monitoring process executed by the control device.

11. The apparatus as in claim 10, wherein at least a portion of the administration traffic data comprises data generated by a network traffic monitor between the control device and the client device in the network, and wherein the apparatus analyzes the administration traffic data by:
matching a network address captured by the monitoring process executed by the control device to a network address captured by the network traffic monitor.

12. The apparatus as in claim 10, wherein the apparatus analyzes the administration traffic data by:
identifying, from the data generated by the monitoring process executed by the control device, a particular process that was executed by the control device to initiate the remote administration session with the client device; and
determining whether the particular process is authorized.

13. The apparatus as in claim 8, wherein determining that the portion of the administration traffic data is malicious is indicative of malfeasance by a trusted administrator in the network.

14. The apparatus as in claim 8, wherein the remote administration session comprises at least one of: a remote desktop administration session, a Secure Shell (SSH) session, or Secure Copy (SCP) session.

15. A tangible, non-transitory, computer-readable medium that program instructions that cause a device to execute a process comprising:
receiving administration traffic data in a network associated with a remote administration session in which a control device remotely administers a client device;
analyzing the administration traffic data to determine whether any portion of the administration traffic data results from an authorized application;
flagging a first portion of the administration traffic data as authorized when the first portion of the administration traffic data is determined to result from the administration session involving the authorized application, wherein a second portion of the administration traffic data is non-flagged;
assessing the administration traffic data to determine whether any portion of the administration traffic data is malicious; and
performing, based on assessing the administration traffic data, a mitigation action in response to determining that a portion of the administration traffic data is malicious, wherein performance of the mitigation action is suppressed when the portion of the administration traffic data determined to be malicious is the first portion of the administration traffic data that is flagged as authorized.

16. The tangible, non-transitory, computer-readable medium as in claim 15, wherein analyzing the administration traffic data comprises:
determining that the control device was operated by an authorized administrator during the remote administration session.

17. The tangible, non-transitory, computer-readable medium as in claim 15, wherein at least a portion of the administration traffic data comprises data generated by a monitoring process executed by the control device.

18. The tangible, non-transitory, computer-readable medium as in claim 17, wherein at least a portion of the administration traffic data comprises data generated by a network traffic monitor between the control device and the client device in the network, and wherein analyzing the administration traffic data comprises:
matching a network address captured by the monitoring process executed by the control device to a network address captured by the network traffic monitor.

19. The tangible, non-transitory, computer-readable medium as in claim 17, wherein analyzing the administration traffic data comprises:
identifying, from the data generated by the monitoring process executed by the control device, a particular process that was executed by the control device to initiate the remote administration session with the client device; and
determining whether the particular process is authorized.

20. The tangible, non-transitory, computer-readable medium as in claim 15, wherein the remote administration session comprises at least one of: a remote desktop administration session, a Secure Shell (SSH) session, or Secure Copy (SCP) session.

* * * * *